(12) United States Patent
Van Groenigen

(10) Patent No.: US 8,915,182 B2
(45) Date of Patent: Dec. 23, 2014

(54) EJECTOR SYSTEM FOR A SQUARE BALER

(75) Inventor: Jan Van Groenigen, Varsenare (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/119,719

(22) PCT Filed: May 24, 2012

(86) PCT No.: PCT/EP2012/059715
§ 371 (c)(1),
(2), (4) Date: Apr. 1, 2014

(87) PCT Pub. No.: WO2012/160140
PCT Pub. Date: Nov. 29, 2012

(65) Prior Publication Data
US 2014/0216279 A1    Aug. 7, 2014

(30) Foreign Application Priority Data

May 24, 2011 (BE) .................. 2011/0316

(51) Int. Cl.
*B30B 15/32* (2006.01)
*B30B 9/30* (2006.01)
*A01F 15/00* (2006.01)
*A01F 15/08* (2006.01)
*A01F 15/14* (2006.01)

(52) U.S. Cl.
CPC ........... *A01F 15/0875* (2013.01); *B30B 9/3014* (2013.01); *A01F 15/145* (2013.01)
USPC ................. 100/188 R; 100/4; 100/7; 100/218

(58) Field of Classification Search
CPC .......................... A01F 15/0875; B30B 9/3014
USPC ...... 100/4, 7, 144, 179, 188 R, 191, 215, 218
See application file for complete search history.

(56) References Cited

U.S. PATENT DOCUMENTS

| 4,269,116 | A | * | 5/1981 | Gordon et al. .................. 100/99 |
| 4,549,840 | A | * | 10/1985 | Ansbjer ........................ 414/24.5 |
| 4,791,865 | A | | 12/1988 | Naaktgeboren |
| 5,540,144 | A | | 7/1996 | Schrag et al. |
| 7,093,537 | B2 | * | 8/2006 | Dubois .................... 100/188 R |
| 2012/0266765 | A1 | | 10/2012 | Dumarey |

FOREIGN PATENT DOCUMENTS

FR        2700099 A1    7/1994

* cited by examiner

*Primary Examiner* — Jimmy T Nguyen
(74) *Attorney, Agent, or Firm* — Patrick M. Sheldrake; Seyed V. Sharifi T.

(57) ABSTRACT

A control system is provided to select the number of dogs automatically in dependence of the position of the last completed bale in the bale case as indicated by the output of a sensor responsive to movement of the bales in the bale case.

4 Claims, 6 Drawing Sheets

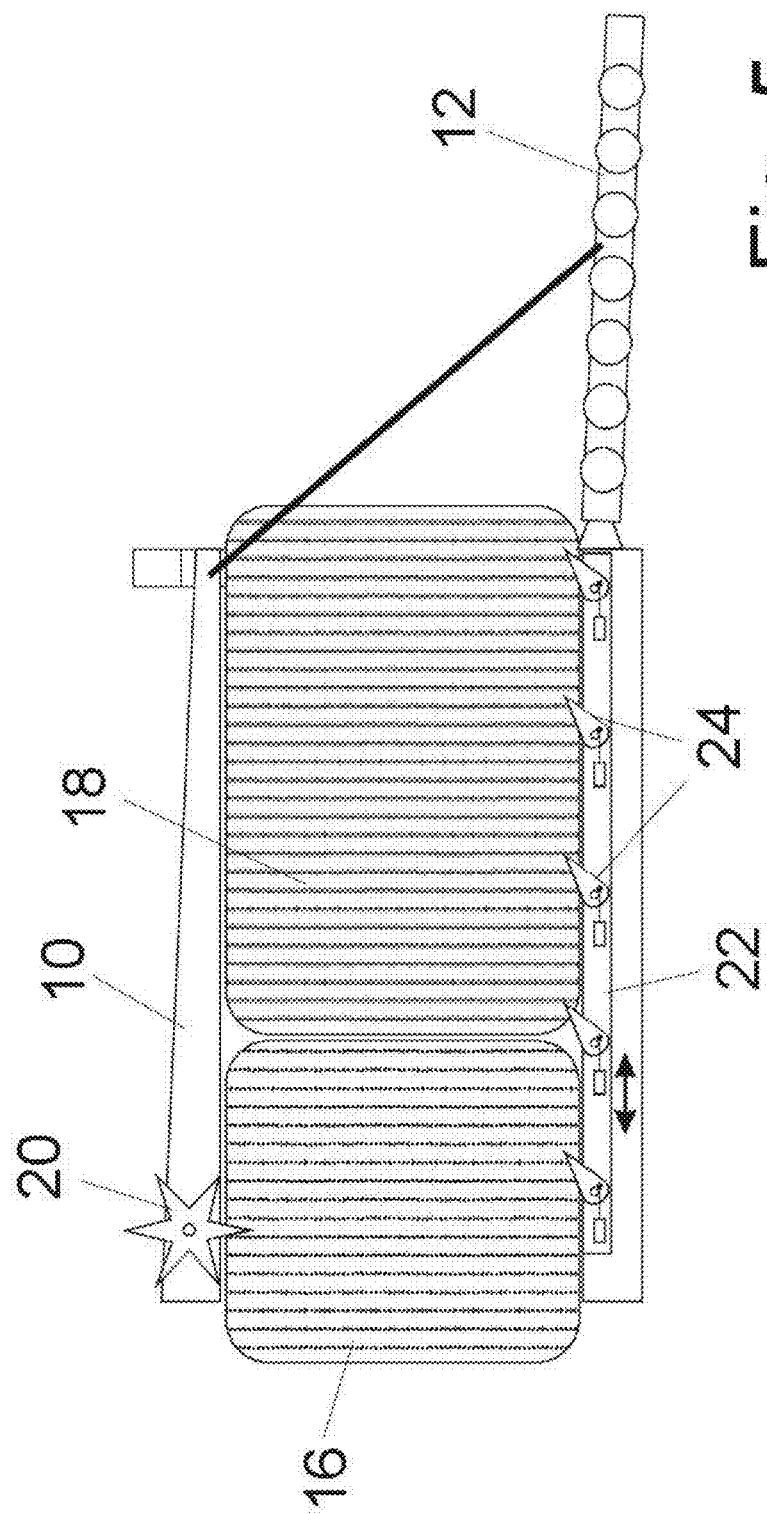

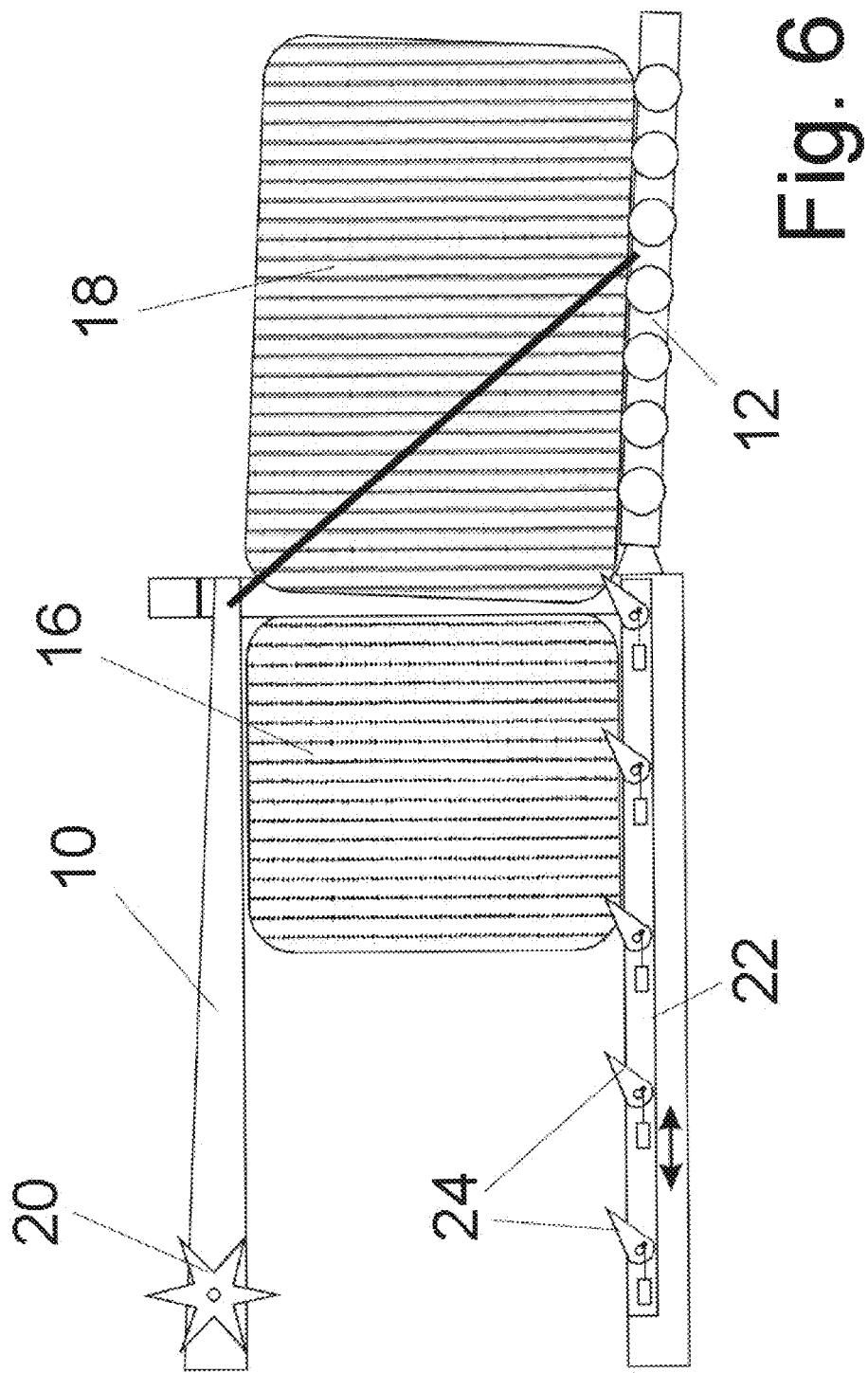

EJECTOR SYSTEM FOR A SQUARE BALER

This application is the US National Stage filing of International Application Serial No. PCT/EP2012/059715 filed on May 24, 2012 which claims priority to Belgian Application BE2011/0316 filed May 24, 2011, each of which is incorporated herein by reference in its entirety.

FIELD OF THE INVENTION

The present invention relates a square baler having an ejector system.

BACKGROUND OF THE INVENTION

During use of a square baler, it is sometimes necessary in the middle of a task to drive the baler over a public road and for this it is required, for safety, to close the bale case by raising the discharge chute. However, if the last completed bale is jutting out of the bale case, it can interfere with the raising of the chute making it necessary for it first to be ejected. For this reason, it is desirable under some circumstance to be able to eject only the last completed bale. In other situations, it is required to eject the entire contents of the bale case after a still incomplete bale (shorter than the desired length) has been tied.

WO96/29195 discloses a square baler which, instead of relying solely on the compacting plunger to unload tied bales from the bale case, comprises an auxiliary ejector system to enable the operator to off-load completed bales. The ejector system comprises a shuttle assembly housed within hollow rails of the bale case. The shuttle assembly consists of a frame that is reciprocated in the direction of movement of the compacting plunger and has dogs projecting upwards from it to engage in the underside of the bales. The dogs grip the bale only during the forward stroke of the shuttle assembly, that is to say when it is moving towards the discharge outlet of the bale case, and slip relative to the underside of the bale during the return stroke. In this way, the reciprocation of the shuttle assembly incrementally advances the bales towards the discharge outlet.

The ejector mechanism of WO96/29195 is controllable to enable the operator to select whether to discharge only the last bale in the bale case (the one nearest the discharge outlet) or both the last bale and the one before it. To achieve this, the dogs are arranged on the shuttle in a longitudinally extending series and at least some of the dogs are controllable by the operator using a manual selector assembly so that the controlled dogs may be positioned either to extend into the bale case or to be retracted from it.

The ejector system of WO96/29195 suffers from the disadvantage that the operator needs first to inspect the position of the bales in the bale case in order to decide on which of the dogs to activate.

Object of the Invention

The present invention seeks to provide an ejector system for a square baler that mitigates the foregoing disadvantages of the prior art.

SUMMARY OF THE INVENTION

According to the present invention, there is provided square baler having a bale case within which crop is compacted by means of a plunger, a discharge outlet at one end of the bale case and an ejector system for advancing bales towards the discharge outlet independently of the movement of the compacting plunger, the ejector system comprising a shuttle assembly mounted in a wall of the bale case for reciprocation parallel to the direction of movement of the bales in the bale case, and a plurality of dogs mounted on the shuttle assembly to engage a bale in the bale case and to advance the bale incrementally out of the discharge outlet as the shuttle assembly reciprocates relative to the bale case, wherein the number of dogs engaging the bales in the bale case is selectable to eject only the last completed bale or both the bales in the bale case, characterised in that a control system is provided to select the number of dogs automatically in dependence of the position of the last completed bale in the bale case as indicated by the output of a sensor responsive to movement of the bales in the bale case.

The invention offers the advantage that the operator need not leave the tractor cab to inspect the baler and for this an embodiment of the invention makes use of the output of a sensor that is normally present in a baler and associated with the knotter. Such a sensor, usually in the form of a spiked wheel that rotates as the bale is advanced, is used to sense the movement of the bale to determine when a bale has reached its desired length. When this occurs, a tying cycle is initiated during which runs of twine used to tie the bale are raised by needles from beneath the bale case to knotters located above the bale case and securely tied. The output of such a sensor is therefore indicative of the position of the last completed bale in the bale case.

If the operator wishes to raised the discharge chute, it is known from the output of the sensor if the last completed bale presents an obstruction. If not, then the chute can be raised without first ejecting any bales. If however it is determined that part of the last completed bale does present an obstruction, then from a knowledge of the position of the last completed bale, it is possible to select the correct number of dogs to achieve maximum traction on the bale to be ejected without interfering with the bale that has yet to be completed.

To empty the bale case completely, the partially completed bale is tied to prepare it to be discharged, then all the dogs are selected regardless of the position of the bales as indicated by the sensor.

BRIEF DESCRIPTION OF THE DRAWINGS

The invention will now be described further, by way of example, with reference to the accompanying drawings, in which:

FIG. 5 is a similar view to the preceding figures showing the dogs of the ejector system set to empty the entire contents of the bale case, and FIG. 6 is the same view as FIG. 5 after operation of the ejector system.

DETAILED DESCRIPTION OF THE PREFERRED EMBODIMENT

The drawings only show the parts of a square baler that are relevant to an understanding of the present invention. The construction of a square baler and of an ejector system comprising a shuttle assembly with dogs for engaging the bales is described in detail in WO96/29195.

Figure 1:
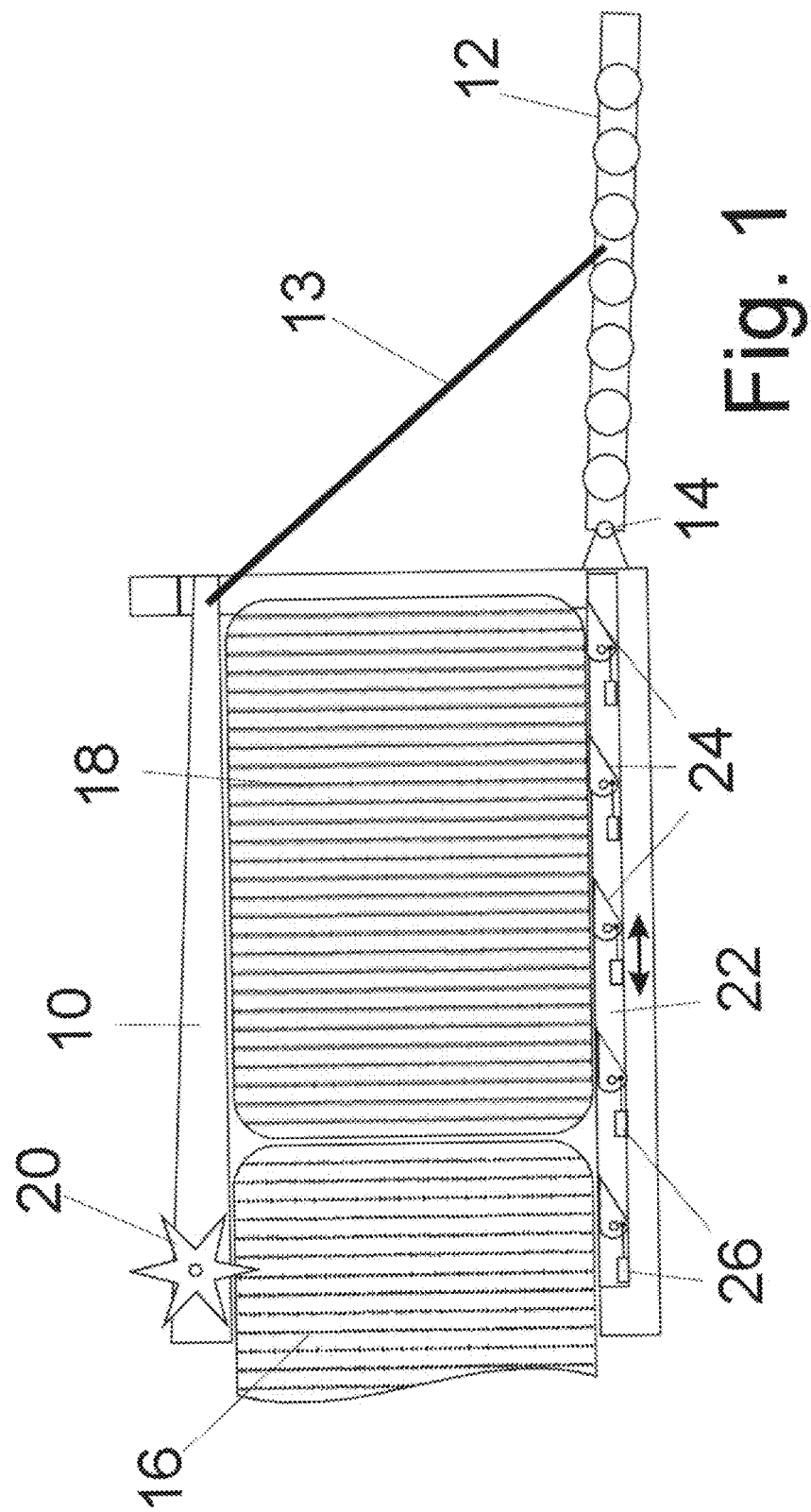
FIG. 1 shows a section through the bale case of a square baler with the discharge chute in its lower position without any bale protruding from the discharge outlet.

FIG. 1 shows a bale case 10 having a discharge chute 12 mounted beyond a discharge outlet. The chute can be pivoted about an axis 14 between a lowered position, shown in FIG. 1, and a raised position, shown in FIG. 2, in which it obstructs the discharge outlet of the bale case 10. In the lowered position, the chute 12 is slightly inclined to the horizontal so that bales will slide along the chute 12 under the action of gravity and fall off the rear end onto the ground. A powered linkage 13 is used to raise and lower the chute 12 which is only represented schematically in the drawings by a heavy line.

As is known and well documented in the prior art, the crop is introduced into the bale case 10 in slices which are compressed by a reciprocating plunger. In normal operation, as the bale 16 that is being formed grows in size, the previously completed bale 18 is pushed out of the bale case and eventually slides off the chute 12, as previously described.

The length of the bale being formed is measured by a sensor 20 comprising a spiked wheel that engages the bale and rotates as the bale moves in the bale case 10. The sensor 20 forms part of a control system designed to produce bales of uniform size. When the bale being formed reaches a desired size, as sensed by the sensor 20, a knotting cycle is initiated to tie the bale with lengths of twine and a new bale is commenced. The tying operation need not be described in detail as it is well known and documented and not of particular relevance to the invention. It is only important to note in the present context that it is possible to determine, from the output of the sensor 20, the position of the ends of the bales in the bale case at any one time.

Figure 2:
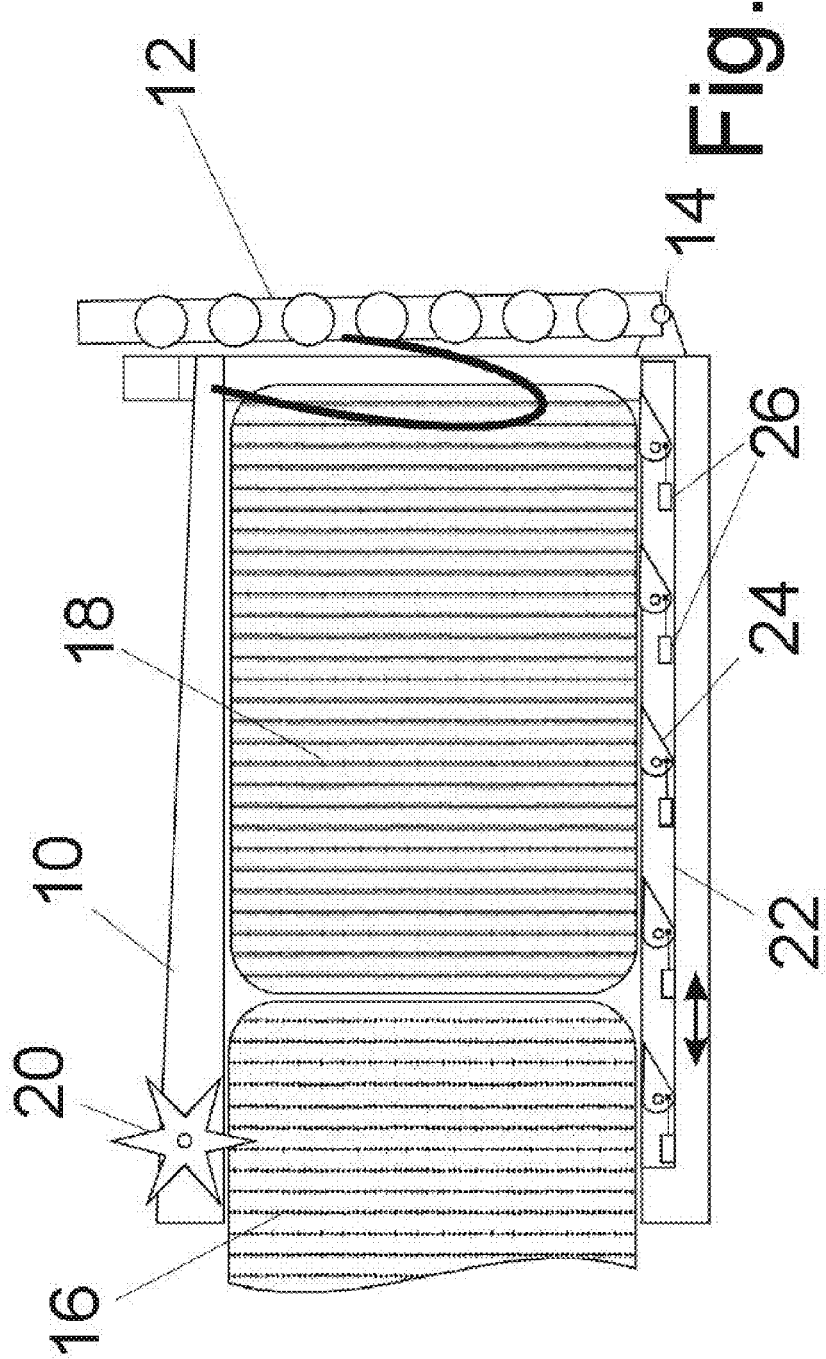
FIG. 2 shows the bale case of FIG. 1 with the discharge chute raised into a safe position in which the chute closes the discharge outlet of the bale case to prevent any bale from falling off during transit.

If during a task it is desired to drive the baler on a public road. for example to travel to another field, it is necessary first to raise the chute 12 to its vertical position, as shown in FIG. 2. In this position, the chute 12 covers the discharge outlet of the bale case 10 and prevents any bale from falling of the baler while it is in transit. If at the time that it is desired to raise the chute, the bales 16 and 18 in the bale case are in the position shown in FIG. 1, then there is no obstruction preventing the chute 12 from being raised and no special action needs to be taken.

Figure 3:
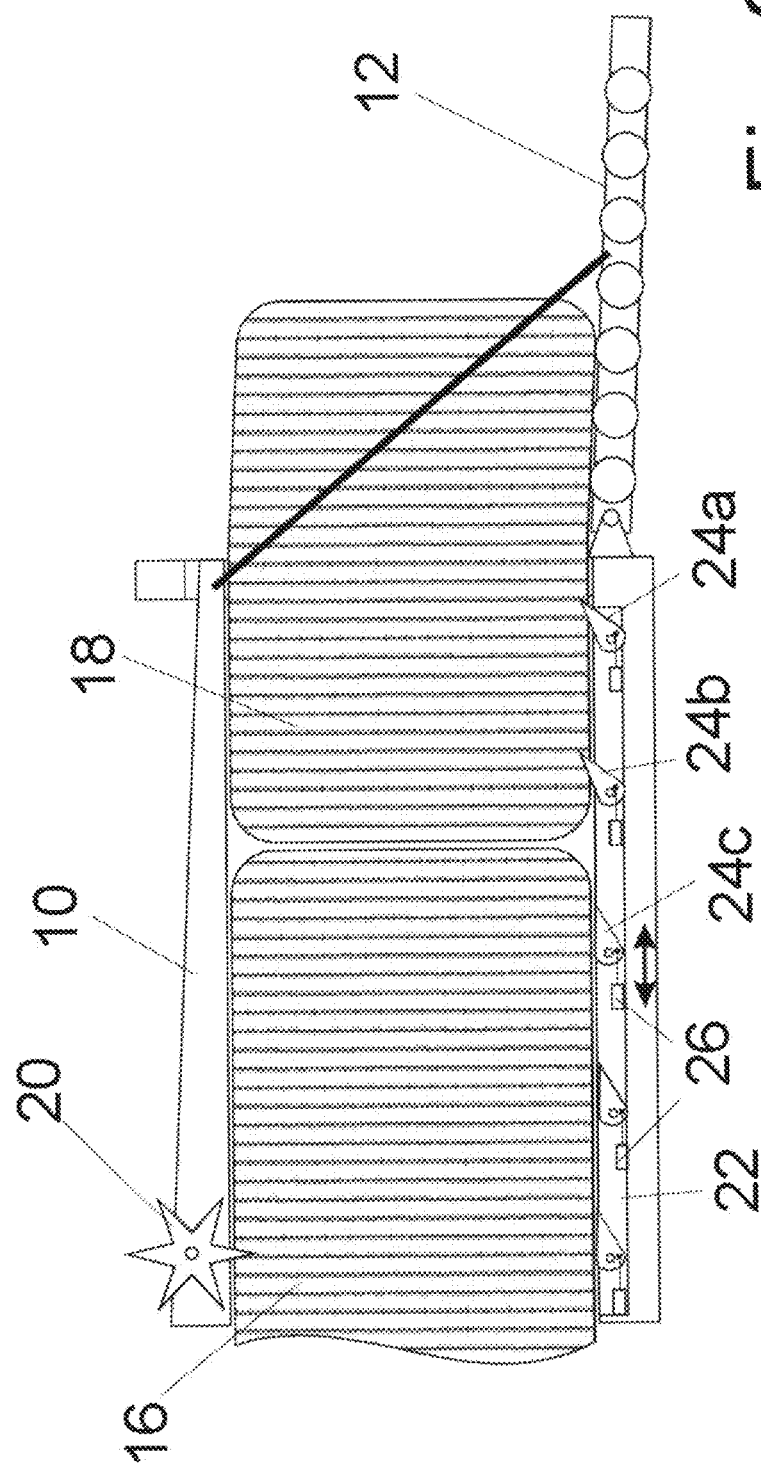
FIG. 3 is a similar view to that of FIG. 1 save that a completed bale partially protrudes from the bale case and prevents raising of the discharge chute.

However, if the bales 16 and 18 are in the position shown in FIG. 3, then it is necessary to empty the bale case 10 partially by discharging the completes bale 18 without interfering with the completion of the bale 16 in the process of being formed. To achieve this, it is not possible to rely on the reciprocation of the compression plunger to advance the completed bale 18 onto the chute 12. Instead, as taught by WO96/29195, a shuttle assembly 22 is mounted in a channels in the floor of the bale case that is connected to a suitable mechanism to cause it to reciprocate in the direction of the movement of the bales. The shuttle assembly carries a set of bale engaging dogs 24 that have an inoperative position, shown for all the dogs in FIGS. 1 and 2, in which they are retracted from the bale case and do not act on the bales, and an operative position shown for all the dogs in FIGS. 5 and 6 in which they engage the bales. The dogs 24 act as one-way gripping devices so that in the forward stroke they push the bales towards the discharge outlet and in the return stroke they automatically retract and slide relative to the bales.

The dogs 24 need not all be in the operative position at the same time and they may be controlled to select the dogs 24 that are in the operative position at any one time. As illustrated, each dog 24 is associated with a separate hydraulic control 26 so that each may be independently selected or rendered inoperative. Individual control is not however essential to the present invention and as an alternative one may provide a control bar that is slidable relative to the shuttle assembly to render operative a selectable number of dogs 24 commencing from the discharge end of the bale case.

The number of dogs that are rendered operative is automatically determined in the present invention by a control system in dependence upon the position of the bales 16 and 18, as indicated by the output of a sensor, preferably the sensor 20 associated with the knotting mechanism. Thus, in FIG. 3, after ascertaining the position of the last completed bale 18, only the first two dogs 24a and 24b are rendered operative by the control system. As the shuttle assembly is reciprocated, these two dogs 24a and 24b will push the last completed bale 18 out of the bale case without having any effect on the bale 16 that it still being produced. Had the bale 18 been protruding to a lesser extent, then the dog 24c would also be rendered operative by the control system and conversely if the bale 18 had been protruding even further from the bale case 10, then only the dog 24a would have needed to be operative.

The advantage of the invention is that the operator does not need to carry out a visual inspection nor to set manually the number of operative dogs. Instead, the operator need only select whether the bale case is to be partially or fully emptied. In the former case, the appropriate number of dogs 24 is automatically selected by the control system based on the sensed position of the bales in the bale case, as described above.

Figure 4:
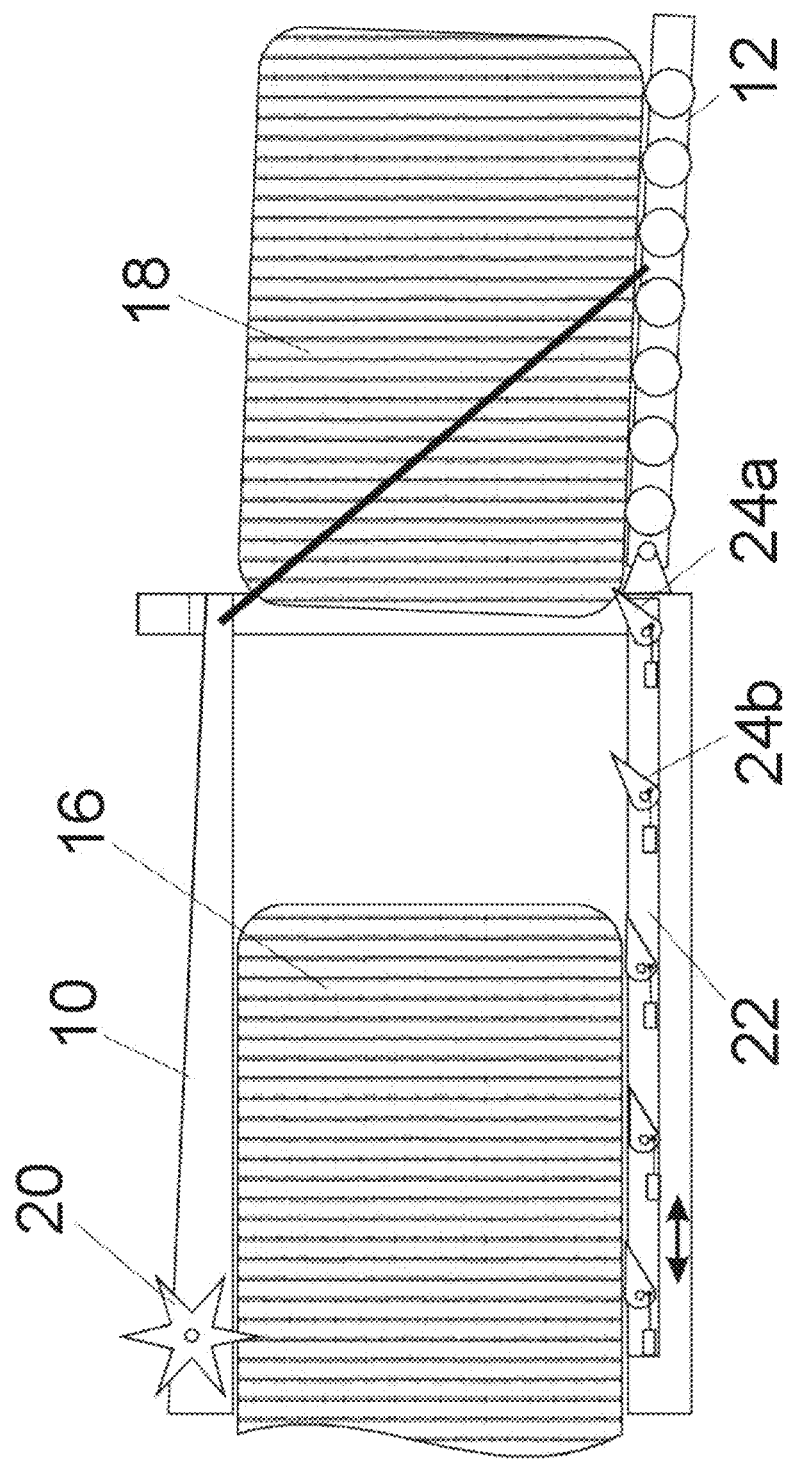
FIG. 4 shows the position of the bales after reciprocation of the shuttle assembly with the dogs selected in the manner shown in FIG. 3.

On the other hand, if the bale case is to be emptied completely, then as shown in FIGS. 4 and 5 all the dogs 24 are rendered operative. In this case, it is preferable to tie the partially completed bale 16 before the ejector system is operated to eject both bales 16 and 18 at the same time.

The invention claimed is:

1. A square baler having a bale case within which crop is compacted by means of a plunger, comprising
    a discharge outlet at one end of the bale case and an ejector system for advancing bales towards the discharge outlet independently of the movement of the compacting plunger, the ejector system comprising a shuttle assembly mounted in a wall of the bale case for reciprocating movement;
    a plurality of dogs mounted on the shuttle assembly to engage a bale in the bale case and to advance the bale incrementally out of the discharge outlet as the shuttle assembly reciprocates relative to the bale case, wherein the number of dogs engaging the bales in the bale case is selectable to eject only the last completed bale or both the bales in the bale case;
    a sensor for sensing bale movement in the bale case, and
    a control system is provided to select the number of dogs automatically in dependence of a position of the last completed bale in the bale case as indicated by the output of the sensor responsive to bale movement in the bale case.

2. A square baler as claimed in claim 1, wherein the sensor is further associated with a knotting system that serves to tie bales when they reach a predetermined size.

3. A square baler as claimed in claim 1, wherein the dogs are individually controllable.

4. A square baler as claimed in claim 1, wherein a bar is movable by the control system relative to the shuttle assembly to render operative a selectable number of dogs commencing the count from the discharge end of the bale case.

* * * * *